(12) United States Patent
Vitale et al.

(10) Patent No.: US 7,111,318 B2
(45) Date of Patent: Sep. 19, 2006

(54) COMMUNICATION SYSTEM WORK ORDER PERFORMANCE METHOD AND SYSTEM

(76) Inventors: Michael J. Vitale, 3644 Belgray Dr. NW., Kennesaw, GA (US) 30152; Gerald K. Rudolf, 1030 E. Edgewood Ave., Indianapolis, IN (US) 46227; Robert J. McCammon, 664 E. County Rd. 400 N., Sullivan, IN (US) 47882; Michael R. Wright, 13060 Sweet Spring Ct., Fishers, IN (US) 46038; Kelly J. Scorzato, 9114 N. Park Ave., Indianapolis, IN (US) 46240; Pingnan Shi, 3387 Buckmoor Pkwy., Greenwood, IN (US) 46143

( * ) Notice: Subject to any disclaimer, the term of this patent is extended or adjusted under 35 U.S.C. 154(b) by 27 days.

(21) Appl. No.: 09/872,030

(22) Filed: Jun. 1, 2001
(Under 37 CFR 1.47)

(65) Prior Publication Data
US 2004/0254757 A1 Dec. 16, 2004

Related U.S. Application Data

(60) Provisional application No. 60/208,950, filed on Jun. 2, 2000.

(51) Int. Cl.
*H04N 7/137* (2006.01)
(52) U.S. Cl. ..................... 725/107; 348/180
(58) Field of Classification Search ................. 725/107; 714/27; 348/180
See application file for complete search history.

(56) References Cited

U.S. PATENT DOCUMENTS

| | | | | |
|---|---|---|---|---|
| 5,111,391 A | | 5/1992 | Fields et al. | |
| 5,155,590 A | * | 10/1992 | Beyers et al. | 725/107 |
| 5,164,897 A | | 11/1992 | Clark et al. | |
| 5,309,351 A | * | 5/1994 | McCain et al. | 700/3 |
| 5,357,519 A | * | 10/1994 | Martin et al. | 714/25 |
| 5,432,542 A | * | 7/1995 | Thibadeau et al. | 725/35 |
| 5,432,705 A | * | 7/1995 | Severt et al. | 702/120 |
| 5,491,742 A | | 2/1996 | Harper et al. | |
| 5,528,660 A | * | 6/1996 | Heins et al. | 379/21 |
| 5,619,489 A | * | 4/1997 | Chang et al. | 370/241 |
| 5,751,802 A | | 5/1998 | Carr et al. | |
| 5,787,000 A | | 7/1998 | Lilly et al. | |
| 5,867,206 A | * | 2/1999 | Voght et al. | 725/107 |
| 5,920,846 A | | 7/1999 | Storch et al. | |
| 5,956,024 A | * | 9/1999 | Strickland et al. | 715/717 |
| 6,026,431 A | | 2/2000 | Hinrichs et al. | |
| 6,049,776 A | | 4/2000 | Donnelly et al. | |
| 6,070,143 A | | 5/2000 | Barney et al. | |
| 6,101,481 A | | 8/2000 | Miller | |
| 6,289,381 B1 | * | 9/2001 | Brodigan | 709/225 |
| 6,353,313 B1 | * | 3/2002 | Estep et al. | 324/160 |

(Continued)

*Primary Examiner*—Chris Kelley
*Assistant Examiner*—Jade O. Laye
(74) *Attorney, Agent, or Firm*—Allen, Dyer, Doppelt, Milbrath & Gilchrist, P.A.

(57) ABSTRACT

A method of performing work on a communication system in accordance with a work assignment includes a step of identifying a data file associated with the work assignment, the data file including subscription information and network location information. The method also includes a step of preparing at least a first set of test parameters for performing a network test, the first set of parameters based on, at least in part, the subscription information and the network location information. The test parameters are then communicated to a test device. Thereafter, the test device performs a first test using the first set of test parameters.

29 Claims, 9 Drawing Sheets

U.S. PATENT DOCUMENTS

| | | | |
|---|---|---|---|
| 6,385,300 B1 * | 5/2002 | Mohammadian et al. | 379/21 |
| 6,516,427 B1 * | 2/2003 | Keyes et al. | 714/25 |
| 6,802,032 B1 * | 10/2004 | Budinger et al. | 714/46 |
| 6,853,932 B1 * | 2/2005 | Wichelman et al. | 702/76 |
| 6,891,803 B1 * | 5/2005 | Chang et al. | 370/252 |
| 2002/0019983 A1 * | 2/2002 | Emsley et al. | 725/107 |
| 2003/0048756 A1 * | 3/2003 | Chang et al. | 370/252 |
| 2005/0028208 A1 * | 2/2005 | Ellis et al. | 725/58 |

* cited by examiner

COMMUNICATION SYSTEM WORK ORDER PERFORMANCE METHOD AND SYSTEM

This application claims the benefit of U.S. Provisional Patent Application Ser. No. 60/208,950, filed Jun. 2, 2000.

FIELD OF THE INVENTION

The present invention relates generally to performing operations on communication systems, and more particularly, to performing operations that involve testing.

BACKGROUND OF THE INVENTION

Community Antenna Television ("CATV") systems are communication systems that transmit and distribute television signals to end users, or subscribers. In general, CATV systems comprise a headend facility and a distribution network. The headend facility obtains television signals associated with a plurality of CATV channels and generates a broadband CATV signal therefrom. The distribution network then delivers the CATV broadband signal to television receivers located within the residences and business establishments of subscribers.

In addition, two-way CATV networks that allow reverse path communications are in common use. Reverse path communications involve the transmission of information from the subscribers upstream over the distribution network to the headend. Consumer demand is currently high for various two-way services such as broadband Internet access, interactive TV, and telephony.

The operation and maintenance of CATV networks requires a significant amount of field work, or in other words, operations performed in portions of the distribution network, away from the headend facility. Examples of field operations include installation of new cable service, installation of new network components, troubleshooting subscriber complaints, and general maintenance of the network. Many field operations are performed by technicians that travel from network location to network location performing various of the above described tasks.

In general, a centralized facility registers or defines the tasks to be performed, and then allocates the various field tasks, referred to herein as work assignments, to the various technicians. A work assignment may be a new subscriber installation, an upgrade to a subscriber installation, or a trouble ticket. A work assignment may also be an instruction to perform general measurements at select areas of the distribution network. Systems that perform allocation of work assignments to technicians are known. Each technician then performs the work assignments allocated to him or her during the course of the work day.

Work assignments typically require testing and measurement of at least one network location related to the work assignment. For example, for work assignments involving poor network performance, comparative measurements provide indications regarding the severity and location of faults, as well as general information regarding the state of the network and network components. In addition, installation of new or upgraded cable service at a subscriber location also requires testing and measurement to ensure that the subscriber has adequate signal levels.

To this end, it is advantageous to perform measurements on a CATV network in conjunction with a work assignment.

Presently, work assignments are provided to CATV technicians as paper forms. The technician travels to the location at which the work is to be done and uses a measurement device or meter to perform the required measurements. In a new service installation, the technician will first execute the connection of the subscriber's internal wiring to the CATV distribution network. Thereafter, the technician will typically perform a measurement of many or all of the channels relevant to the subscriber to ensure that appropriate signal levels are present on each channel.

In connection with a trouble ticket, the technician will typically perform a measurement on one or more channels prior to performing any maintenance. The technician may then use information from the measurement to attempt to identify and remedy the problem that caused the generation of the trouble ticket.

One issue that arises in connection with the performance of measurements in connection with work assignments relates to the increasing complexity of the CATV network. In the past, most subscribers of a given CATV system received all analog channels, all on the same channel frequencies, with perhaps a few optional pay channels. Thus, the measurements used for each subscriber could remain relatively identical. For example, the measurement device could be configured to measure all of the same channels for all of the subscribers, with perhaps a small variation for the optional pay channels.

In recent times, however, the advent of digital channels that use differing modulation schemes, and the increase in pay channels and in levels of service have greatly varied the number and types of channels received by various subscribers. Moreover, as CATV service providers either expand into new territory or consolidate with other service providers, the channel allocations may vary from place to place on a single distribution network. Accordingly, the technician must either obtain information regarding the configuration of channels for each work assignment, or in the alternative, the technician must deduce the configuration by performing several tests or by other means. Obtaining configuration information is often impracticable. The deduction techniques, on the other hand, are inefficient and inconvenient.

Accordingly, the increasing complexity of CATV service has generated a need for a more efficient manner in which to perform work assignments that involve measurement and testing in a CATV network in which different locations have different channel plans.

SUMMARY OF THE INVENTION

The present invention address the above stated need, as well as others, by providing a method and system for communicating test information to a test meter that includes subscriber specific information, or at least test parameters derived from subscriber-specific information. In this manner, the technician may execute tests with the test meter that take into account the channel configuration that is pertinent to the user. As a result, the technician's work assignment may be carried out more efficiently.

A first embodiment of the present invention is a method of performing work on a communication system in accordance with a work assignment. The method includes a step of identifying a data file associated with the work assignment, the data file including subscription information and network location information. The method also includes a step of preparing at least a first set of test parameters for performing a network test, the first set of parameters based on, at least in part, the subscription information and the network location information. The test parameters are then communicated to a test device. Thereafter, the test device performs a first test using the first set of test parameters.

Another embodiment of the present invention is a central control system for use in a testing system that employs one or more remote test units. The central control system includes a central controller and a communication system. The central controller is operable to identify a data file associated with the work assignment, the data file including subscription information and network location information. The central controller is further operable to prepare at least a first set of test parameters for performing a network test, the first set of parameters based on, at least in part, the subscription information and the network location information. The communication circuit is operable to communicate the first set of test parameters to a remote test device.

Yet another embodiment of the present invention is a test meter for use in testing a communication system. The test meter includes a communication circuit, a measurement circuit, and a controller. The communication circuit is operable to communicate with a central control system. The measurement circuit is operable to obtain measurements from the communication system. The controller is operably coupled to the communication circuit. The controller is operable to communicate information corresponding to a data file to the central control system via the communication circuit, the data file including network address information and subscription information. The controller is further operable to receive a first set of test parameters from the head end controller, the first set of test parameters based on the network address information and subscription information. The controller is also operable to cause the measurement circuit to perform a first test based on the first set of test parameters.

The above describe features and advantages, as well as others, will become more readily apparent to those of ordinary skill in the art by reference to the following detailed description and accompanying drawings.

DETAILED DESCRIPTION

Figure 1:
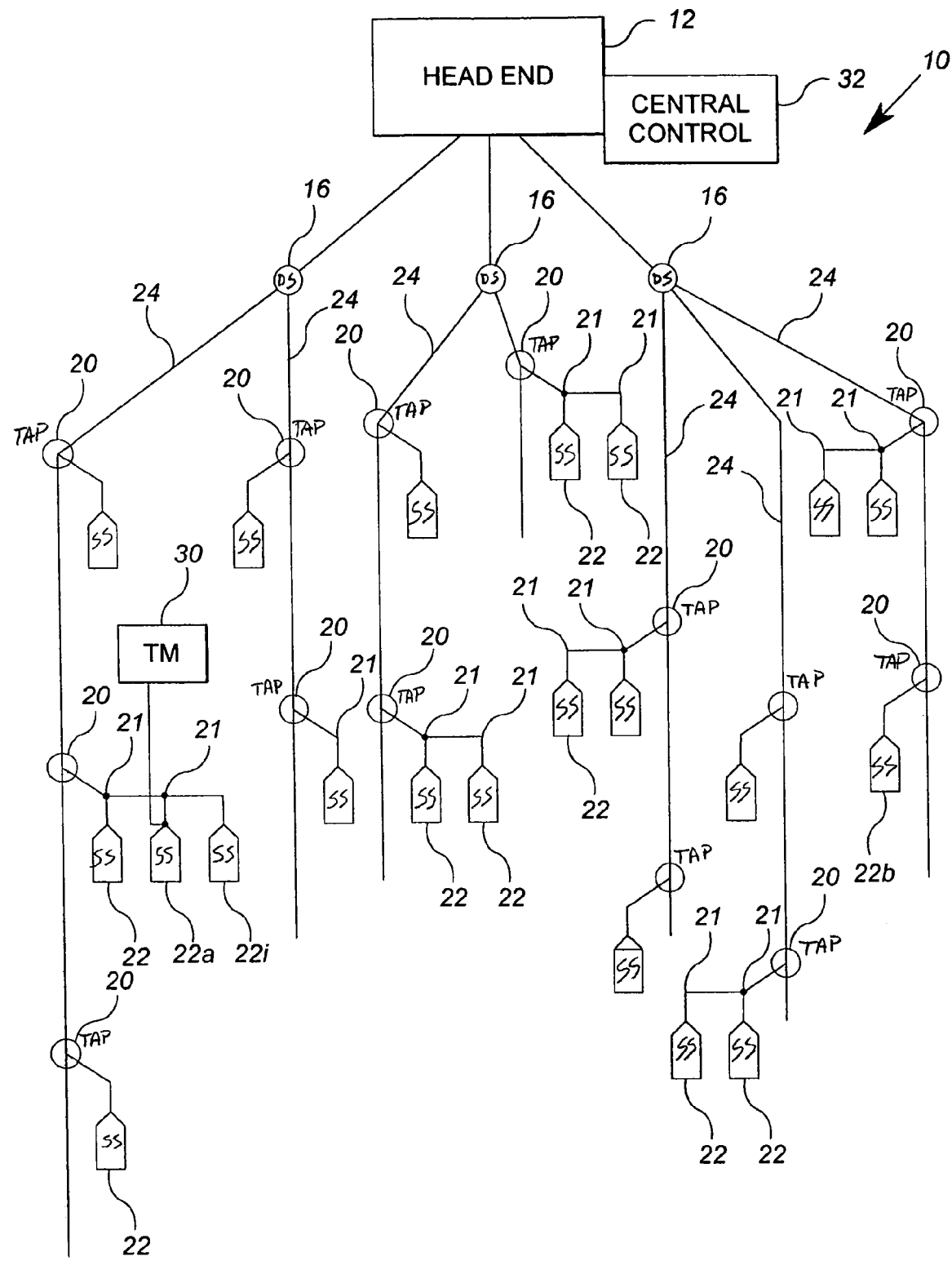
FIG. 1 shows a exemplary block diagram of test configuration according to the present invention, the test configuration employed in an exemplary CATV network.

FIG. 1 depicts a schematic of a CATV communication network 10 in which the present invention may be used. Content or information signals are generated via playback machines or received via satellite and the like at the head end 12 of the network 10. The head end 12 modulates these information signals onto carrier signals at various channel frequencies of the network 10. The network 10 is further comprised of distribution sites or nodes 16, network tap lines 20, subscriber drop lines 21, and subscriber sites 22. These sites are coupled together by a propagation medium 24 that is typically coaxial cable, fiber optic cable, or a combination of both. Throughout the propagation medium may be other devices, including amplifiers.

The frequency spectrum of the propagation medium is divided into channels that are approximately 6 MHz wide and include the carrier frequency used to define the channel. In general, a carrier signal at the channel frequency is modulated with an information signal using either analog or digital techniques to provide content for the channel.

The modulated carrier waves for all of the channels on which the network 10 provides content are transmitted via a transmitter at the head end 12 to a plurality of distribution sites 16. The signals are amplified for further transmission at distribution sites 16. From a distribution site 16, the signals may be delivered over the propagation medium 24 to other distribution sites 16 or to a plurality of subscriber sites 22 via tap lines 20 and subscriber drop lines 21. Tap lines 20 may terminate in one or more subscriber drop lines 21. The subscriber taps 20 provide the frequency spectrum of propagation medium 24 to a subscriber site 22 with little attenuation of the signals being transmitted in the bandwidth of medium 24. That is, taps 20 are designed to provided the signals on medium 24 to a subscriber site 22 without causing significant parasitic loss of signals on medium 24. The signals are decoded at the subscriber site and used to drive televisions, computers, or the like.

Signals may be modulated using analog or digital modulation techniques. Analog signals are typically amplitude-modulated using a baseband signal having a standard format, known as the NTSC format. A common digital modulation scheme used in known CATV systems is the QAM modulation scheme. Pixel data of images, such as the pixels of a frame of moving picture data, to be transmitted over a CATV system are encoded by a known method, such as one of the Moving Picture Expert Group (MPEG) methods. Once the image data is encoded using an MPEG scheme or the like, this encoded data stream is used to modulate a carrier frequency for a channel in accordance with a known digital modulation scheme, such as QAM. The encoded data stream is used to modulate the amplitude and phase of the carrier frequency.

Each of the subscriber sites 22 are associated with a subscriber that has one of a plurality of channel plans. The channel plan identifies the channel frequencies on which content is accessible to the subscriber, and what type of signal is present on each of the available channel frequencies. For example, if the CATV system makes available sixty analog channels and forty digital channels, then the subscriber at the subscriber site 22a may have access to only thirty-five of the analog channels which the subscriber at the subscriber site 22b may have access to fifty-five analog channels and thirty digital channels. Other subscribers may likewise have access to other combinations of available channels.

Moreover, it is possible that the configuration of the available channels varies throughout the network. For example, the location (i.e. frequency) of the analog channels available to the subscriber site 22a may differ from the location of the analog channels available to the subscriber site 22b.

In accordance with the present invention, a test meter 30 is automatically and separately configured for the subscriber site 22a and 22b based on subscriber specific information as discussed in further detail below in connection with FIGS. 2–8. The test meter 30 is operable to obtain the information necessary for its automatic configuration from a central control system 32 that has access to subscriber specific information in the form of one or more databases. The central control system 32 may be, but need not be, located at or near the head end 12.

Figure 2:
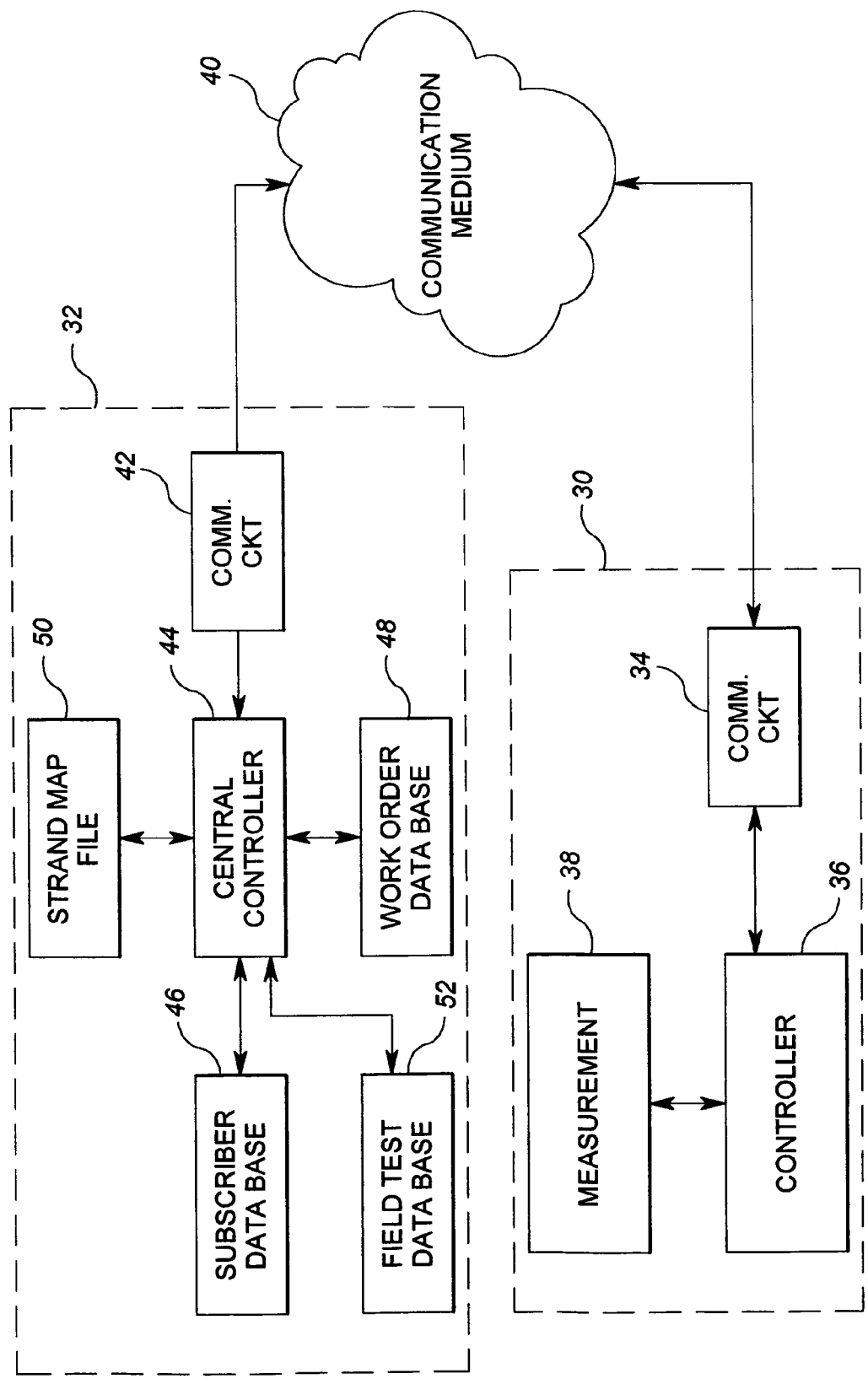
FIG. 2 shows a schematic block diagram of an exemplary test system according to the present invention.

Referring to FIG. 2, there is shown a schematic block diagram of an exemplary test system according to the present invention that includes the test meter 30 and the central control system 32. The test meter 30 includes a communication circuit 34, a controller 36, and a measurement circuit 38. The central control system 32 includes a communication circuit 42, a central controller 44, a subscriber database 46, a work assignment database 48, a strand map database 50, and a field test database 52.

Figure 3:
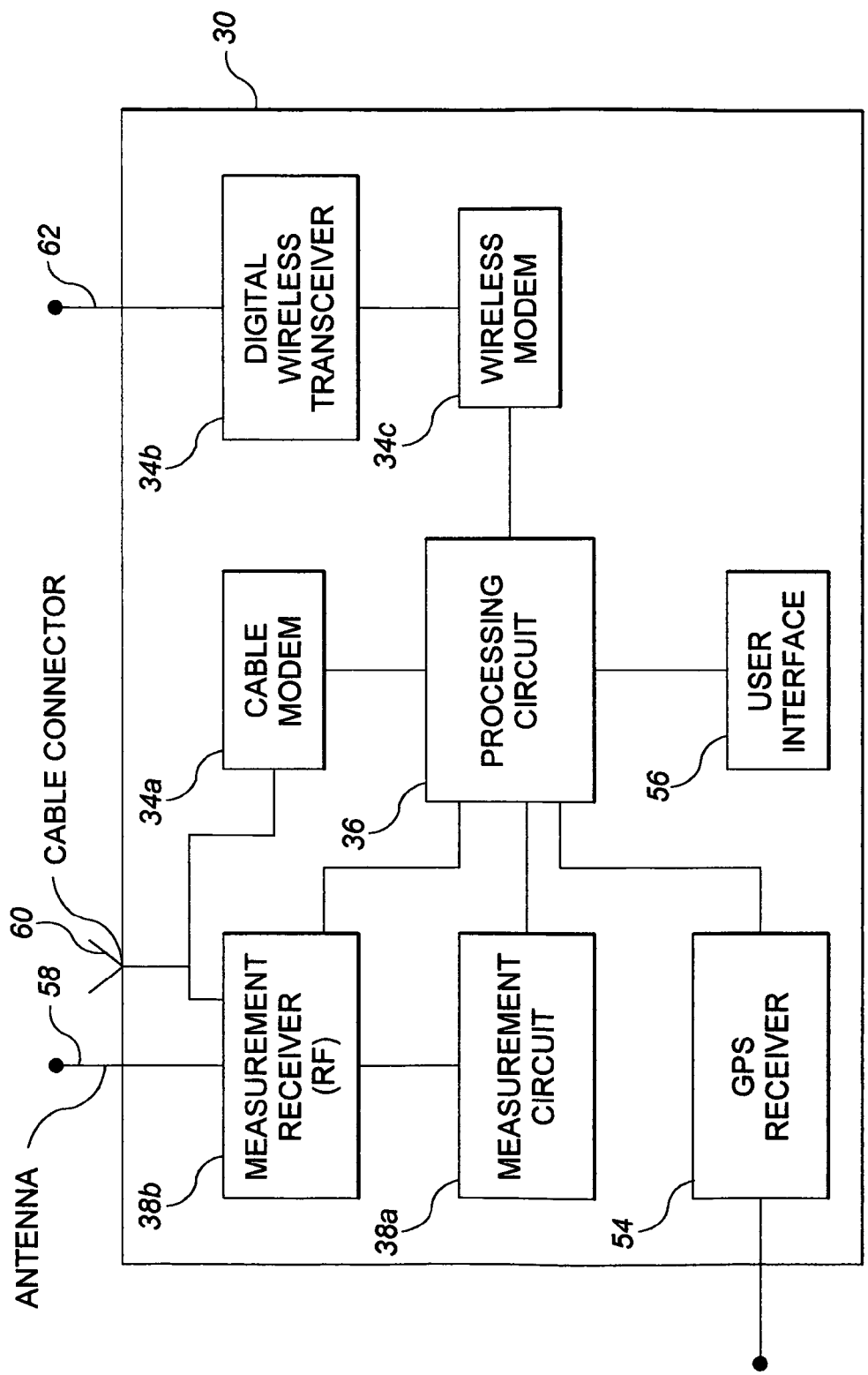
FIG. 3 shows a schematic block diagram of an exemplary test meter according to the present invention.

The communication circuit 34 of the test meter 30 is coupled to the controller 36 and is operable to effectuate communication between the controller 36 and one or more devices connected to a communication medium 40. For example, the communication circuit 34 in the exemplary configuration shown in FIG. 2 enables communication between the controller 36 and the central control system 32. To this end, the communication circuit 34 is one or more devices that are configured to communicate over the communication medium 40. Thus, for example, if the communication medium 40 is a wireless system, then the communication circuit 34 may suitably be a wireless transmitter/receiver. If the communication medium 40 is the CATV distribution network, then the communication circuit 34 may suitably be a cable modem. As shown in FIG. 3, discussed further below, the test meter 30 may be configured to communicate over plural media by including a combination of communication devices.

The measurement circuit 38 is a device that is operable to perform one or more tests on a CATV network, under the control of the controller 36. Preferably, the measurement circuit 38 is operable to test signal levels on both analog and digital channels. To this end, the measurement circuit 38 may include separate subcircuits for measurement of such channels. For example, the measurement circuit 38 may include a circuit such as that disclosed in U.S. Pat. No. 5,867,206 to Voght et al. for measuring analog channels, while also including a circuit such as that disclosed in either U.S. Pat. No. 6,061,393 to Tsui et al. or U.S. patent application Ser. No. 09/821,582, now U.S. Pat. No. 6,761,370 all of which are incorporated herein by reference.

In any event, the measurement circuit 38 is preferably operable to tune to a particular channel frequency and obtain a signal level measurement, under the control of the controller 36. Typically, the controller 36 controls the measurement circuit 38 to perform measurements on a succession of channel frequencies in what is commonly known as a sweep test.

In any event, the controller 36 is a device that is operable to control the operations of the measurement circuit 38 in accordance with subscriber specific information obtained from the central control system 32. As a result, the controller 36 is operable to generate a test that is configured specifically for the subscriber.

In particular, in accordance with one aspect of the present invention, the controller 36 is operable to communicate information corresponding to a subscriber data file to the central controller 44 via the communication circuit 34. The subscriber data file, which a file in a database that is accessible by the central controller 44, includes network address information and subscription information. In the exemplary embodiment described herein, the subscriber data file is located within the subscriber database 46, and includes various subscriber-specific information. As will be discussed further below in detail, the information communicated by the controller 36, however, merely provides sufficient information so that the central controller 44 can locate the pertinent subscriber data file.

In any event, once the information corresponding to the subscriber file is communicated to the central controller 44, the controller 36 is further operable to receive a first set of test parameters from the central controller 44, the first set of test parameters based on the network address information and subscription information. In other words, the controller 36 is operable to receive the subscriber-specific test parameters. The controller 36 is also operable to cause the measurement circuit 38 to perform a first test based on the first set of test parameters.

With reference to the central control system 32, the communication circuit 42 is a device that is operable to enable communications between the central controller 44 and devices connected to the communication medium 40, such as the test unit 30. Ideally, the communication circuit 42 includes a number of sub-circuits that are operable to communicate through any of a plurality of communication media, such as over the CATV distribution system and over a wireless radio system. The communication circuit 42 may also include an arrangement that allows data to be communicated to an internetwork such as the Internet. That arrangement may include an ordinary telephone system modem or a more sophisticated modem that communicates via a T1 line, DSL line or CATV system.

The subscriber database 46 is a database that includes a plurality of subscriber data files. The precise format of the subscriber data files is not particularly relevant to the present invention. The subscriber files should include, however, information identifying a network address of the subscriber and information identifying the subscription level associated with the subscriber. The network address information comprises information that specifies the connection of the subscriber with respect to other elements on the CATV distribution network. To this end, each CATV service provider typically maintains a mapping of its distribution network, which identifies how the various subscribers are connected to the network, as well as the upstream and downstream paths of the network. Such information is often retained in what is sometimes called a strand map, referenced herein as the strand map data base 50. The strand map data base 50 includes the data that delineates the various connections of and to the CATV distribution network. The location identifier in the subscriber file is an identifier which correlates to a location on the network that is identifiable on the strand map data base 50.

A diagram of exemplary embodiment of a subscriber data file 100 of the subscriber data base is provided in FIG. 4, which is discussed further below.

The work assignment data base 48 contains data that tracks the information regarding particular work assignments that are generated. In accordance with the exemplary embodiment described herein, work assignments in the form of work orders are actually tracked primarily through the subscriber database 46. In particular, work orders, as the term is used herein, refers to a work assignment associated with a particular subscriber, such as adding or changing CATV service. Accordingly, work orders may readily be tracked through the subscriber database 46. However, other work assignments arise from generalized complaints or alarm conditions indicating a problem in the CATV network 10. Those work assignments, referred to herein as trouble tickets, typically cannot conveniently be associated with a particular subscriber. As a result, trouble ticket tracking is accomplished through the use of the work assignment data base 48, which is comprised of trouble ticket files which include a trouble ticket identifier and information pertaining to the problem, such as its approximate network location.

A diagram of exemplary embodiment of a trouble ticket data file 140 of the work assignment database is provided in FIG. 6, which is discussed further below.

It will be appreciated, however, that in the alternative, all work assignments, both trouble tickets and work orders, may be tracked using the work assignment database 48. In general, the decision as to how to divide up the storage of the data within the various data bases described herein is largely a matter of design choice and often depends on several factors. One such factor is the convenience and economy of using one or more pre-existing databases, which may have been designed for another purpose.

The strand map database 50 is a data base that includes location data files corresponding to the various entities in the CATV distribution network, such as the subscriber drop lines 21, the street taps 20, and distribution nodes 16. (See FIG. 1). The location data file for a particular network entity may have any suitable structure, but should include network location ID information and information identifying the adjacent network entities. The location data file should also include street address or other geographical location information such that a true strand map may be shown. A CATV strand map, as is known in the art, illustrates a geographical map, typically a street map, and correlates the location of the various CATV network identities thereto. With location data files that identify the entity, its relative network location, and geographical information, a strand map may be electronically displayed and maintained.

A diagram of an exemplary embodiment of a location data file 120 of the strand map data base 50 is provided in FIG. 5a, which is also discussed further below.

A field test database 52 contains measurement level data for the various locations or entities on the network. The measurement level data may constitute predefined specification data and/or historical measurement data. As will be discussed below, access to such data can be helpful to the field technician in the performance of network maintenance and problem diagnosis. Such data may also be used for CATV system monitoring.

A diagram of an exemplary embodiment of a level data file 160 of the field test data base 50 is provided in FIG. 5b, which is also discussed further below.

In any event, the central controller 44 is a processor-based circuit that is operable to communicate work assignment information to one or more, a preferably a plurality of test meters such as the test meter 30. To this end, the central controller 44 is operably connected to the data bases 46, 48, 50 and 52 to obtain information relevant to a work assignment that may be useful to the technician using the test meter 30. In particular, the central controller 44 is operably connected to the databases 46, 48, 50 and 52 to obtain data that is specific to the portion of the CATV network at which the technician and the test meter 30 are located. The central controller 44 is further operable to transmit some or all of such data, and/or generate test parameters for the technician based on the data. In this manner, the technician using the test meter 30 may obtain relevant information regarding any part of the CATV network from a location that is remote from the databases 46, 48, 50 and 52.

To this end, in accordance with one aspect of the present invention, the central controller 44 is operable to identify a subscriber data file associated with a work assignment, the subscriber data file including subscription information and network location information. The central controller 44 is further operable to prepare at least a first set of test parameters for performing a network test, the first set of parameters based on, at least in part, the subscription information and the network location information. The central controller 44 is thereafter operable to communicate the first set of test parameters to the test meter via the communication circuit 42.

Two exemplary operations of the above described arrangement are provided below in connection with FIGS. 7a, 7b, 8, 9 and 10. However, for an understanding of those operations, it is helpful to have further information regarding the kind of information that is stored within the subscriber data base 46, the work assignment data base 48 and the strand map data base 50. To this end, FIGS. 4, 5, and 6 illustrate exemplary data files from the databases 46, 50, and 48, respectively, and are described herebelow.

Figure 4:
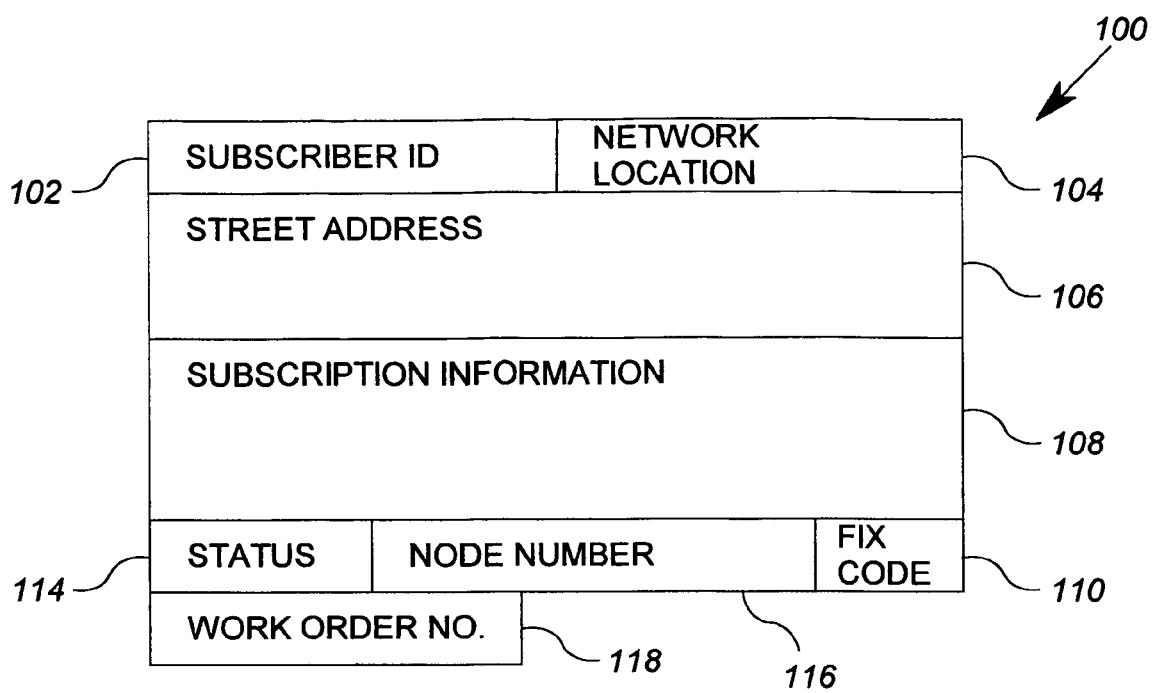
FIG. 4 shows a diagram of an exemplary data file stored in the data base of the test system of FIG. 2.

Referring specifically to FIG. 4, the data file 100 represents an exemplary structure of a data file of the subscriber database 46 of FIG. 2. The data file 100 is described and shown to provide a generalized description regarding the types of data associated with each relevant file, and is not intended as a detailed description of the data structures themselves. The exemplary data file 100 includes a customer ID field 102, a network location ID field 104, a street address field 106, a subscription information field 108, a fix code field 110, a status field 114, a node number field 116, and a work order number field 118. Preferably, a subscriber data file such as the file 100 exists for each subscriber to the CATV service.

The subscriber ID field 102 stores an identification value associated with the subscriber. The identification value may be in the form of a name, a billing number, social security number, account number or the like. In an ideal case, both a unique customer number and the subscriber's name is stored in one or more fields. The inclusion of a unique customer number facilitates ease of use of the data file 100 for multiple purposes, including billing and accounting. The inclusion of the subscriber name facilitates use of the name on billing documents or by the technician in the performance of a work order.

The network location ID field 104 includes an identifier from which the location of the subscriber's connection with respect to the rest of the CATV network may be ascertained. The network location ID data may, for example, be used as an index or searchable element of the strand map database 50. (See FIG. 2). Preferably, each CATV network provider assigns a network location ID to each entity on the network.

The strand map database 50 and/or other data cross correlate the network locations with street address locations.

The street address field 106 contains street address information describing the common street address for the subscriber. In alternative embodiments, such information may be stored in the strand map database 50, and the street address may be retrieved by cross reference to the location data file (see FIG. 5a) associated with the network location ID from field 104 of the subscriber data file 100 of FIG. 4.

The subscription information field 108 contains information identifying the channels to which the subscriber has access. Such information may be in the form of a list of channels, but more likely is a list of services to which the subscriber has subscribed. For example, the subscription information field 108 may identify whether the subscriber has so-called "basic" CATV service, which may include less than twenty channels, "normal" CATV service, which may include fifty to sixty channels, or still higher levels of service. Moreover, the subscription information field 108 includes information identifying any limited access or pay television channels to which the subscriber has subscribed.

It will be appreciated that the subscription information field 108 may actually comprise several fields, some relating to pay television channels, and others relating to service levels. The use of the word "field" herein merely describes related types of data that may be found within each particular data file. Those of ordinary skill in the art may readily devise their own particular database structure for storing the types of data described above and herebelow in conjunction with particular subscribers.

The fix code field 110 contains information identifying the general nature of the work order identified in the work order field 118, discussed below. For example the fix code information may comprise one of the following diagnosic/action codes, "Install", "Snowy Picture", "Ghosting/Ingress", "Flashing", "Audio Program", "Single Channel Outage", or "Cable Modem Problem". Preferably, all or most subscriber-based work orders may be characterized as one of the defined fix codes. Those of ordinary skill in the art may readily define a standard set of fix codes in which subscriber work orders may be characterized. Typically, the fix code for a particular work order number (see field 118) is identified by the CATV service provider.

The status field 114 contains one or more flags or bytes that identify the status of the subscriber's connection. In a preferred embodiment, the status field 114 identifies the status of the most recent work order number related to the subscriber. The most recent work order number for the subscriber is stored in the work order number field 118. For example, if a work order has just been opened for the subscriber, the new work order number is stored in the work order number field 118 and the status field 114 would contain data indicating that the work order is open. Once the work order is completed, the status field 114 may be changed to indicate that the work order has been closed. The work order number field 118, however, would remain the same until a new work order is assigned. The work order number is often used by software that assigns work orders to technicians, which is not a part of the present invention.

The node number field 116 identifies the node to which the subscriber's connection to the CATV distribution network is attached. The node, as is used herein and as is commonly used in the art, is a hierarchical network entity to which a large number of subscribers are connected. Exemplary nodes 16 are shown in the network 10 of FIG. 1. A node typically branches off to serve on the order of five hundred subscribers. It is noted that the node number may typically be derived from the network location ID in the network location ID field 104. Accordingly, the use of a separate field as the node number field 116 may not be necessary. However, it may be useful to have the node number readily available within a separate field as shown in FIG. 4.

Figure 5A:
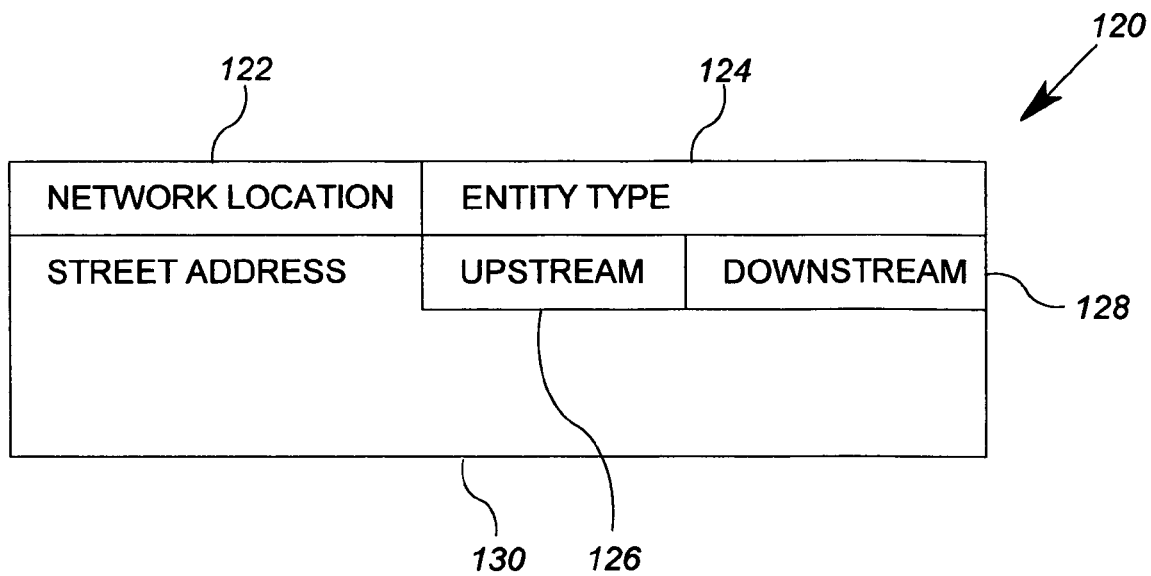
FIG. 5a shows a diagram of a second exemplary data file stored in a second exemplary data base of the test system of FIG. 2.

FIG. 5a shows a diagram of an exemplary location data file 120 that may be used in the strand map database 50 of FIG. 1. As with the data file 100 of FIG. 4, the data file 120 is provided as a generalized description regarding the types of data associated with the relevant file, and is not intended as a detailed description of the data structures themselves. The data file 120 includes a network location ID field 122, an entity type field 124, an upstream entity ID field 126, a downstream entity ID field 128, and a street address field 130.

A location data file such as the location data file 120 preferably exists for each entity on the CATV distribution network, including subscriber sites, street taps, amplifiers, distribution nodes as well as others known to those of ordinary skill in the art.

In any event, as discussed in connection with the corresponding field in the subscriber data file 100, the network location ID field 122 includes an identifier from which the location of the network entity with respect to the rest of the CATV network may be ascertained. Accordingly, the network location ID field 122 is preferably a unique identifier.

The entity type field 124 includes information identifying the type of entity that is located at the network location. For example, the entity type may be an amplifier, a street tap 20, a subscriber drop 21, or a distribution node 16. (See, e.g., FIG. 1).

The upstream entity ID field 126 includes information identifying the next upstream (toward the head end) entity on the CATV distribution network. By way of example, the upstream entity ID field 126 could comprise the network location ID of the adjacent upstream entity.

The downstream entity ID field 128 includes information identifying the next downstream (away from the head end) entity on the CATV distribution network. By way of example, the downstream entity ID field 128 could comprise the network location ID of the adjacent downstream entity.

Figure 5B:
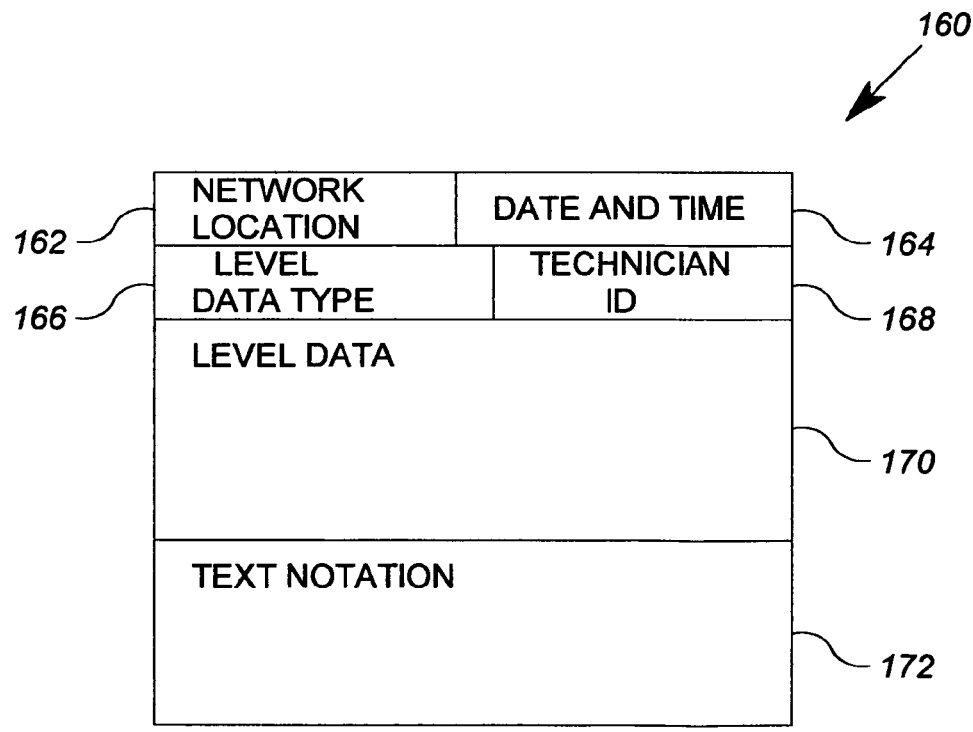
FIG. 5b shows a diagram of a third exemplary data file stored in a third exemplary data base of the test system of FIG. 2.

FIG. 5b shows an exemplary level data file 160 from the field test database 52 of FIG. 2. Preferably, a separate level data file exists for each measurement level generating occurrence that has occurred. The measurement level generating occurrences typically relate to past work assignments in which measurements had been taken. However, another measurement level generating occurrence may be the definition of ideal or desired measurement specifications. Each level data file 160 is preferably associated with a single network location ID.

To this end, the level data file includes a network location ID field 162, a date and time field 164, a level data type field 166, a technician ID field 168, a level data field 170, and a text notation field 172. The network location ID field 162 contains information identifying the network entity to which the data in the file 160 corresponds. The date and time field 164 contains information identifying when the data in the file 160 was generated. The level data type field 166 identifies the type of level data (e.g., measurement or specification) is stored in the file 160. The technician ID field 168 identifies the technician associated with gathering the data in the file 160.

The level data field 170 contains the measurement data for the network location identified in field 162. The measurement data may be historical measurement data or specification measurement data. Historical measurement field 110 includes data from past measurement tests. The data may, for example, include signal-to-noise ratio ("SNR") measurements, absolute power level measurements, noise measurements, or other types of signal level measurements taken during a previous work assignment at the subscriber location.

The specification measurement data includes measurement levels that are deemed to fall within a predetermined specification for the relevant network location. In particular, when CATV distribution networks are designed or modified, certain baseline specification requirements are generated for different areas of the network. For example, a network location that is immediately downstream of an amplifier may have specifications for higher signal levels than a network location that is substantially downstream from any amplifiers. Such baseline specifications are preferably stored for many if not all of the network locations. The baseline specification data may include baseline data for SNR levels, absolute levels, and/or various noise levels.

Ideally, each network location will have several level data files 160 associated therewith. At least one of the associated data files 160 contains specification measurement data while several of the associated data files 160 contain historical measurement data. Such data is useful for many purposes, including as providing a baseline for future diagnostics.

The text notation field 172 preferably includes other data from previous work assignments related to the network location ID. For example, the text notation field 172 may include textual observation recorded by a technician during a previous work assignment.

Figure 6:
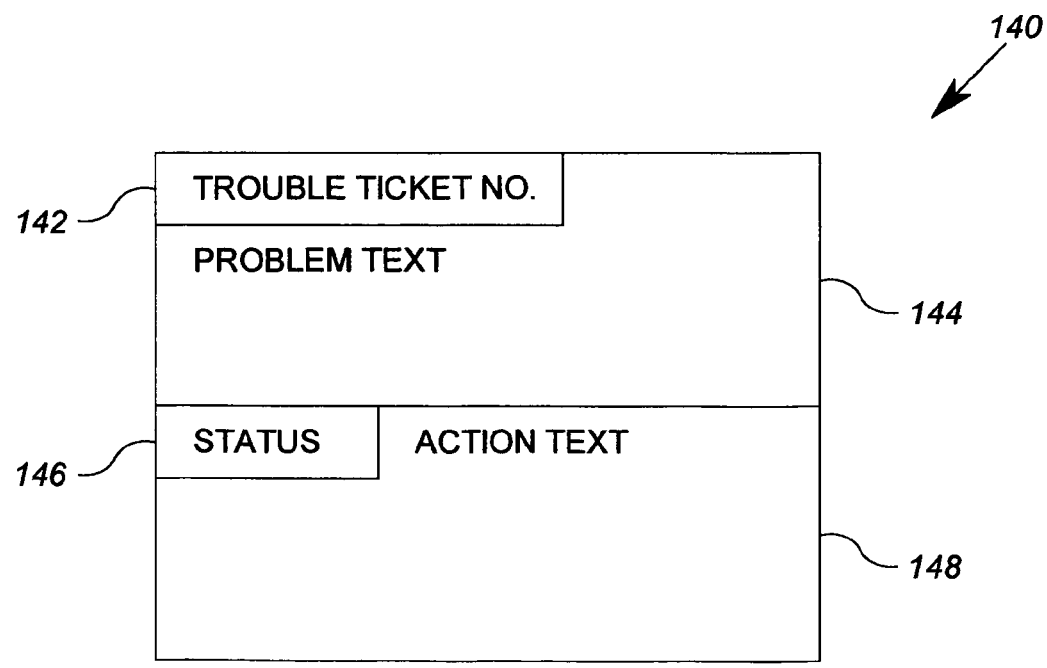
FIG. 6 shows a diagram of a fourth exemplary data file stored in a fourth exemplary data base of the test system of FIG. 2.

FIG. 6 shows an exemplary trouble ticket data file 140 from the work assignment data base 48. As discussed above, the work assignment data base 48 in the exemplary embodiment described herein retains data relating only to those work assignments that are not typically associated with a particular subscriber. Such work assignments, referred to herein as trouble tickets, arise when sufficient customer complaints in a general area indicate a problem with the network, or when automated CATV network monitoring devices signal an alarm condition in a particular area of the network. The generation of the trouble ticket information is outside the scope of the present invention. Those of ordinary skill in the art could readily determine how and when to generate trouble tickets in accordance with their own network service strategies.

The trouble ticket data file 140 includes a trouble ticket ID field 142, a problem text field 144, a status field 146, and an action text 148. The trouble ticket ID field 142 contains a unique identifier for the trouble ticket item. The problem text field 144 contains text relating to the trouble ticket, such as a description of the events that led to the formation of the trouble ticket. For example, the problem text field 144 may contain text describing that several complaints were received in a certain time period from a certain neighborhood. The problem text field 144 may also contain text describing out of limit conditions detected by a monitor device that is associated with a certain part of the network.

The status field 146 contains information identifying whether the trouble ticket has been resolved. The status field 146 may simply be a binary field signifying whether the trouble ticket has been resolved, or may contain several status code, such as those identifying whether the trouble ticket has just been generated, whether one or more unsuccessful attempts to resolve the trouble ticket have been attempted, and whether the trouble ticket has been partially resolved.

The action text field 148 contains text information relating to any prior action taken in connection with the trouble ticket. The action text field 148 should also contain a date and time stamp as well as a technician ID for any prior action taken. For example, if a prior technician had measured a particular network location ID in connection with the trouble ticket, the action text field 148 should contain a notation identifying the network location ID tested, the technician ID, and a time and date stamp. If a prior technician had replaced a coupling element in connection with the trouble ticket, then the action text field 148 should contain a notation identifying that the coupling element was replaced, the network location, any measurements taken, the technician ID, and the date and time. Such information allows a technician to obtain all the relevant history associated with a particular trouble ticket.

Figure 7A:
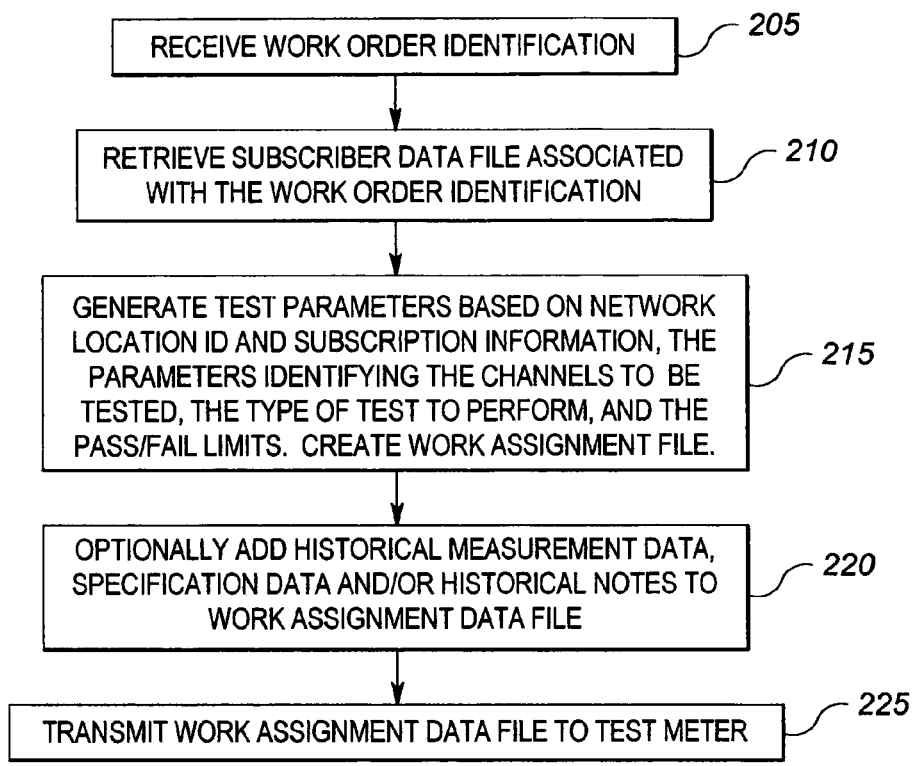
FIGS. 7a and 7b show flow diagrams of the operations of the central controller of the test system of FIG. 2 in accordance with a first exemplary work assignment operation;.
Figure 7B:
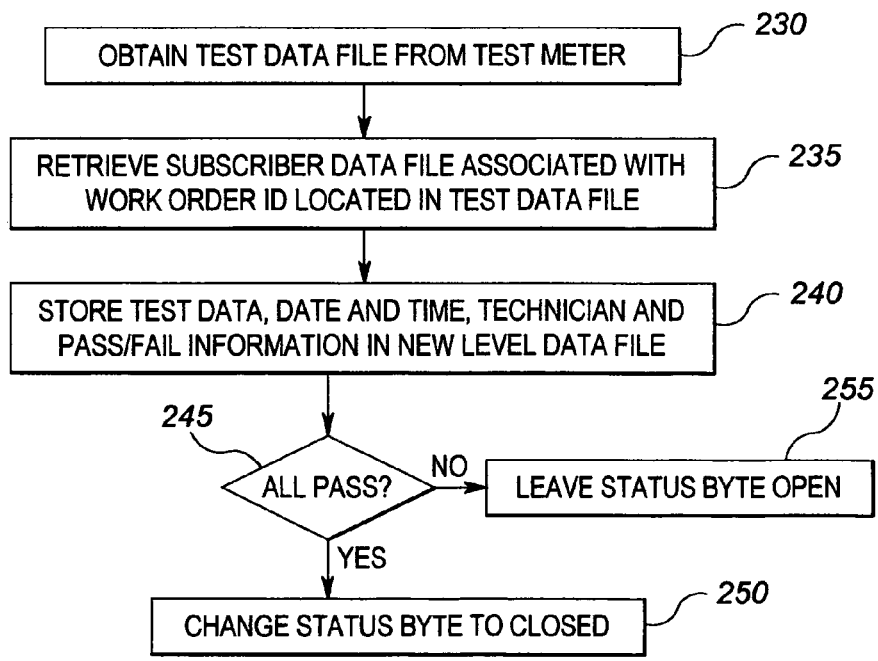
Figure 8:
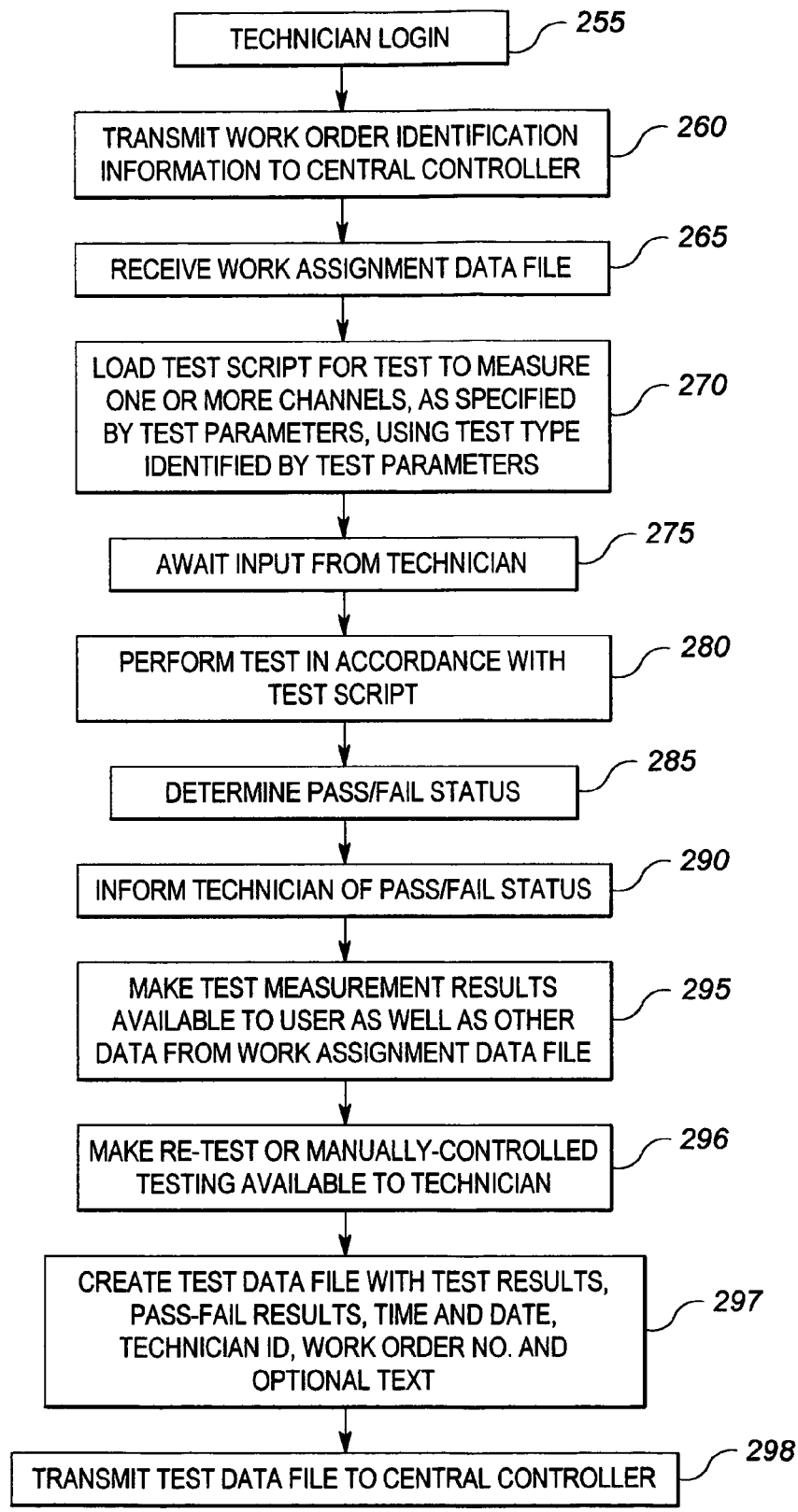
FIG. 8 shows a flow diagram of the operations of the test device of the test system of FIG. 2 in accordance with the first exemplary work assignment operation.

A first exemplary operation of the system of FIGS. 1 and 2 is provided through the description of the operations of the central controller 44 and the test meter controller 34 in the flow diagrams of FIGS. 7a, 7b and 8. FIGS. 7a and 7b show the operations of the central controller 44 while FIG. 8 shows the operation of the test meter controller 34. The first exemplary operation involves a work assignment that is associated with a particular subscriber, i.e., a work order.

Referring to FIG. 7a, the central controller 44 in step 205 first receives information identifying a work order from the test meter controller 34 (see step 305 of FIG. 8). As discussed in further detail below in connection with step 305 of FIG. 8, the received information may suitably be the work order number, a street address, a subscriber identifier, or even global positioning satellite coordinates.

After step 205, the central controller 44 executes step 210. In step 210, the central controller 44 retrieves from the subscriber data base 46 the subscriber data file associated with the information received in step 205. To this end, the central controller 44 must first associate the received information with a particular subscriber data file. If the information received in step 205 is the work order number, for example, then the central controller 44 can search the work order number field 118 of the data files in the subscriber data base 46 for the relevant work order number. Similarly, if the received information includes a street address, the central controller 44 can search the street address field 106 of the data files in the subscriber data base 46. Likewise, if the information received in step 205 is a customer ID, then the central controller can search the subscriber ID field 102 of the data files in the subscriber data base 46 can be searched. If, however, the received information consists of GPS coordinates, then the central controller 44 may employ a look-up table that correlates absolute geographic coordinates to either the street address or network location and then retrieve the corresponding data file using the correlated information.

In any event, the central controller 44 in step 210 retrieves the data file that represents the subscriber location at which the work assignment is to take place. After step 210 is completed, the central controller 44 proceeds to step 215.

In step 215, the central controller 44 generates a work assignment data file that includes a set of test parameters. The set of test parameters define, among other things, the channel frequencies to be tested. The set of test parameters also preferably define the pass/fail limits of the test, and may identify different test types for different channel frequencies. Multiple test may be defined for some or all of the channel frequencies depending on the fix code of the related subscriber data file 100.

To determine the channel frequencies to be tested, or test channel plan, the central controller 44 determines which channels are pertinent to the subscriber, and then which channel frequencies correspond to the channel pertinent to the subscriber. The channel frequency correspondence must be determined because the allocation of frequencies to channels may vary throughout the CATV network. For example, a channel designated as channel 4 may be located at one frequency in one part of the network 10 (see FIG. 1) and may be located at another frequency in another part of the network 10. As discussed above, such varying channel frequency allocations often result from mergers or other consolidations of multiple CATV service networks into a single network.

The central controller 44 determines the channel frequency allocations by obtaining location information for the subscriber and internally determining the appropriate overall channel configuration that applies to the subscriber location. The obtained location information may comprise the network location ID from the field 104, the street address information from the field 106 or the node number from the field 116. The overall channel configuration identifies all of the channel frequencies for all of the possible channels, and typically also identifies the modulation type (e.g.digital or analog). In most cases, the entire CATV distribution network will employ no more than a few different overall channel configurations.

Once the appropriate overall channel configuration is identified for the subscriber location, then the central controller 44 selects the channel frequencies that correspond to the some or all of the channels pertinent to the subscriber. The central controller 44 identifies the channels to which the subscriber has access based on the subscription information field 108 of the subscriber data file 100.

The test channel plan thus includes channel frequencies that correspond to the subscriber's level of service. As a result, more channel frequencies will be tested for a subscriber that has access to eighty channels than for a subscriber that has access to twenty channels. Likewise, it is not necessary to test any channel frequency that is not within the channels pertinent to the customer. For example, if the customer does not have access to channels located at over 150 MHz, then there is no need to test any channel frequencies exceeding 150 MHz.

Accordingly, the test channel plan is determined based on the subscription information field 108 as well as location information. In some alternative embodiments, the subscription information field 108 could contain the channel frequencies that correspond to the channels to which the subscriber has access. In such an embodiment, the test channel plan may be developed solely from the subscription information field.

The test parameters preferably also include pass/fail limits. In particular, the test parameters identify what level of signal (or other measured level) is required or deemed acceptable. The limits may be provided on a channel by channel basis, but usually may be represented by a single level for all channels of the same modulation type.

The test parameters preferably also include test type information that is correlated to the channel plan. Test type information identifies the number and kinds of tests that will be performed, and may differ from channel to channel. Test type information identifies not only the quantity measured for each test, but also method used to perform the measurement. In particular, the method for performing SNR measurements on analog channels can be different that the method for performing SNR measurements on digital channels. Accordingly, the test type information might identify an analog SNR measurement for all of the analog channels in the channel plan and a digital SNR measurement for all of the digital channels in the channel plan. Other types of measurements may also be specified.

The central controller 44 determines the test type parameters based on the overall channel plan and on the fix code information in field 110 of the subscriber data file 100. In particular, select fix codes may require or suggest the performance of specific types of tests. For example, a new installation may require a full SNR test of each relevant as well as an ingress scan, while a cable modem problem may require another type of test. Thus, the central controller 44 may identify the kinds of tests, in part, on the fix code for the work order. The central controller 44 preferably further defines the test type parameters based on the channel plan. In particular, even if a particular test is specified (e.g., SNR) based on the fix code, the central controller 44 must select between analog SNR testing and digital SNR testing for the channel frequencies of the channel plan, based on the channel plan information.

The central controller 44 selects pass/fail parameters based on predefined specifications for the service. The pass/fail parameters may vary from location to location, depending on the location of the subscriber with respect to amplification stages. Accordingly, the pass/fail parameters may be based in part on the network location ID from the field 104 of the subscriber data file. However, basic service level requirements are typically employed uniformly for all subscribers.

Once the central controller 44 generates the set of test parameters and stores the set of test parameters in the work assignment data file in step 215, the central controller 44 proceeds to step 220. In step 220, the central controller 44 optionally stores historical measurement data and/or specification measurement data in the work assignment data file. Such information may be of use to the technician performing the work assignment. To this end, the central controller 44 obtains such data by retrieving some or all of the level data files 160 from the field test data base 52 that correspond to the network location identified in the network location ID field 104 of the subscriber data file 100. The retrieved data files 160 should contain specification measurement data for the network location and/or historical measurement data and text notations from one or more prior tests. Such data may then be appended to the work assignment data file.

Such historical and/or specification data is more useful in diagnosis and treatment of network problems or subscriber service than in new installations. Accordingly, such information need not be provided in the work assignment data file if the work assignment is an installation of new service to a new subscriber. Thus, it is possible that such information would only be included in the work assignment data file upon request of the technician, which may be received with other data in step 205, discussed above. Alternatively, such data may only be included if the fix code in the field 110 of the subscriber data file 100 corresponds to a situation in which such reference measurement data would be useful.

In any event, once the work assignment data file is complete, the central controller 44, in step 225, transmits the work assignment data file to the test meter 30. To this end, the central controller 44 provides the information to the communication circuit 42. The communication circuit 42 transmits the work assignment data file over the communication medium 40 to the test meter 30.

The central controller 44 then awaits action information, e.g., closeout information, for the work assignment. In particular, the central controller 44 awaits for some response from the test meter 30. Once the response is received, central controller 44 performs a closeout operation in connection with the work order. The closeout operation is triggered by the receipt of a test data file from the test meter 30. (See step 230 of FIG. 7b). Closeout is an important function that logs activity that occurs in connection with a work order.

Pending receipt of the test data file, the central controller 44 may perform steps 205 to 225 for other test meters in other parts of the CATV network, and indeed may perform closeout operations for other test meters.

Before discussing the closeout operation of the central controller 44 as shown in FIG. 7b, it is advantageous to understand the operation of the test meter 30 in generating the test data file. To this end, reference is made to FIG. 8, which as discussed above, shows the operations of the test meter controller 36 in connection with the first exemplary operation described herein.

Before discussing the operations of FIG. 8, it may be advantageous to understand in further detail the structure and operation of an exemplary embodiment of the test meter 30 of FIG. 2. FIG. 3 shows in further detail an exemplary embodiment of the test meter 30 that may be employed in connection with the operations of FIG. 8 (and FIG. 10, discussed below).

The test meter 30 of FIG. 3 includes a cable modem 34a, a wireless modem 34b, a wireless transceiver 34c, a measurement circuit 38a, a measurement receiver 38b, a controller 36, a global positioning satellite ("GPS") receiver 54, a user interface 56, a leakage antenna 58, a cable connector 60, and a wireless transceiver antenna 62. It will be noted that the test meter 30 of FIG. 3 is given by way of example only, and that many of the advantages of the present invention may be obtained in a test meter that does not employ a GPS receiver 54, multiple communication circuits 34a, 34b, and 34c, a separate leakage antenna 58, and any combination of the above. However, each of those features enhances the advantages of the test meter 30 of the present invention to some degree.

The wireless modem 34c and the digital wireless transceiver 34b represent one portion of the communication circuit 34 of FIG. 2 that allows for digital wireless communication between the controller 36 and the central control system 32. In addition, the controller 36 and the wireless modem 34c may cooperate to allow the controller 36 to access the central control system 32, as well as other data sources, through an internetwork such as the Internet using the world wide web. Wireless web devices are known and may readily be implemented by those of ordinary skill in the art. The ability to access the wireless internetwork allows the technician to receive, via the test meter 30, other information useful in performing work assignments. Information that is available on the world wide web and may be useful in the performance of work assignments include street maps, travel direction services, weather reports, and the like. In any event, the wireless transceiver 34b and wireless modem 34c are configurable to access the central controller 44, either through the internetwork or through a private communication channel.

The cable modem 34a is configured to communicate with the central control system 32 through the CATV distribution network. The cable modem 34a may also be configured to access the internetwork to provide the added functions discussed above. To these ends, the cable modem is coupled to the cable connector 60.

The controller 36 is coupled to each of the wireless modem 34c, the cable modem 34a, the measurement circuit 38a, the measurement receiver 38b, the user interface 56 and the GPS receiver 54. The user interface 56 provides a means by which the technician may provide information and input to the controller 36 as well as a means by which the controller 36 may communicate results, data and/or queries to the technician. To this end, the user interface 56 may suitably include a display and a keypad. However, other user interface devices such as voice synthesis and voice recognition, among others, may be employed.

The GPS receiver 54 is a device, well known in the art, that obtains relatively precise geographical location information from satellite transmissions. The GPS receiver 54 provides the information to the controller 36. The precision location information may actually be used to automatically generate location information to transmit to the central control system 32 during a work assignment.

The measurement circuit 38a and the measurement receiver 38b operate to tune to particular frequencies and perform measurements thereon. The measurement receiver 38b tunes to the frequency to be tested under the control of the processing circuit 36. The measurement receiver 38b then provides the frequency band of interest, typically converted to an intermediate frequency ("IF") or even baseband, to the measurement circuit. The measurement circuit 38a obtains a measurement value from the signal received from the measurement receiver 38b and provides the measurement value to the controller 36. Thus, to measure a multiplicity of channel frequencies, the controller 36 causes the measurement receiver 38b to tune to each channel frequency of a test channel plan in sequence, and then receives from the measurement circuit 38a a measurement value for each tuned frequency. The controller 36 stores the received measurement value in a manner that is associated with the tuned frequency. Such controlled measurement devices are well known.

For ordinary signal strength or SNR measurements, the measurement receiver 38b receives input signals to be measured from the cable connector 60. However, to measure leakage of signals from the CATV system into the atmosphere, the measurement receiver 38b may be configured to receive signals from the antenna 58. A measurement receiver 38b that is configurable to receive and tune signals from either an antenna or a cable input for measuring signal strength and leakage signal strength is taught by U.S. Pat. No. 5,982,165 to Bowyer et al., which is incorporated herein by reference.

Referring again to FIG. 8, the operations of the controller 36 in the test meter 30 in connection with the performance of a work order are shown and discussed herebelow. The operations of FIG. 8 effectively start the general procedure shown in FIGS. 7a, 7b and 8.

In step 255, the controller 36 receives the technician ID login. To this end, the controller 36 may receive the login from peripheral device or the user interface 56. The technician login identifies the technician that is using the test meter 30 for the work assignment. Technician ID login information may either be required for each work assignment, or may carry over for several work assignments until power is removed, the login is removed by the technician, or a new login is received.

In any event, once the technician ID login is obtained in step 255, the controller 36 proceeds to step 260. In step 260, the controller 36 transmits work order identification information to the central controller 44 of the central control system 32. As discussed above, the work order identification information may be any information from which the controller 44 may discern a unique work order number. For example, the work order ID information may comprise the actual work order number, the customer identification, the street address, or even GPS coordinates.

In any event, once the controller 36 transmits the work order information in step 260, the controller 36 awaits reception of the work assignment data file from the central controller 44. At this point, the central controller 44 would perform the steps of FIG. 7a, discussed above. Accordingly, after step 260, the controller 36 awaits completion of the flow diagram of FIG. 7a by the central controller 44.

Thereafter, in step 265, the controller 36 receives the work assignment data file from the central controller 44. The contents of the work assignment data file are described above in connection with steps 215 and 220. The work assignment data file typically includes at least a set of test parameters. Once the work assignment data file is received, the controller 36 proceeds to step 270.

In step 270, the controller 36 defines one or more test scripts based on the test parameters, and in particular, on the channel plan and the test-type information within the test parameters. A test script may be defined for each test type identified in the test parameters. Thus, for example, if the test parameters define a plan to test channel frequencies 15 MHz, 21 MHz, 27 MHz, and 33 MHz using an analog signal level test type, then the controller 36 generates a test script in which the controller 36 will, upon activation of the test script, cause the measurement circuit 36a to perform analog signal level tests and cause the measurement receiver 36b to tune to each of the frequencies 15 MHz, 21 MHz, 27 MHz, and 33 MHz, such that an analog signal level test is performed at each frequency.

Once the test script(s) is(are) completed in step 270, the controller 36 proceeds to step 275. In step 275, the controller 36 awaits input from the technician to activate the script(s). To this end, the controller 36 may prompt the technician to run each script via the user interface 56. The controller 36 preferably allows the technician to select which of several test scripts to run in the event that multiple test scripts have been defined in accordance with the test parameters. Moreover, the controller 36 may provide the technician with several options, including manually configuring a test, via menus or selections through the user interface 56. Thus, the technician may run the automatically generated test script (s), or may devise his or her own test. A more complete description of menu-driven operation of the controller 36 is provided in FIG. 10. Such a menu-driven operation may readily be incorporated into the work order operation of FIG. 8, if deemed advantageous. However, at a minimum, the user interface 56 allows the technician to activate the test script generated in step 270.

After input is received from the technician in step 275, the controller 36 proceeds to step 280. In step 280, the controller 36 causes the test to be performed in accordance with the test script. As a result of the performance of the test, the controller 36 obtains one or more measurement values for one or more channel frequencies identified by the channel plan. In step 285, which may happen concurrently with, or after, step 280, the controller 36 determines the pass/fail status of the test. To this end, the controller 36 compares the obtained measurement values with the pass/fail information within the received test parameters in the work assignment data file. In alternative embodiments, the pass/fail information is predefined and stored within the meter 30. In either event, the pass/fail status is determined from the comparison of the pass/fail limits defined in the pass/fail information and the obtained measurement values.

After the pass/fail status is determined in step 285, the controller 36 notifies the technician of the pass/fail status in step 290. To this end, pass/fail status information is provided to the user interface 56.

Thereafter, or concurrently, in step 295, the controller 36 makes the measurement values available for review by the technician via the user interface 56. In this manner, the techinician may obtain further information in the event of a failed test. Moreover, the technician may desire to see the individual measurements of the channel frequencies for other purposes, even in the event of a passed test. In addition, in step 296, the user interface 56 enables the technician to select a retest, or manually configure a test, similar to step 275. In addition, the controller 36 may make the historical data available to the technician through the user interface 56, if such data was included in the work assignment data file.

In step 297, the controller 36 generates a test data file that incorporates the test measurement values, the pass/fail results, a time and data stamp, the technician identification, and the work order number. The controller 36 also allows the technician to add optional text into the test data file. The optional text may suitable include descriptions of observations or actions taken by the technician during the performance of the work order.

In step 298, the controller 36 causes the test data file to be transmitted to the central controller 44. At that point, the central controller 44 may execute the closeout operations.

Referring now to FIG. 7b, the central controller 44 begins the closeout operations by first obtaining the test data file from the meter controller 36 in step 230. The controller 44 thereafter, in step 235, obtains the subscriber data file associated with the work order ID that is located in the test data file. As discussed above in connection with step 225 in FIG. 7a, the central controller 44 typically performs other functions after transmitting the work assignment data file, and therefore may not retain the relevant subscriber file between steps 225 and 230. Accordingly, the central controller 44 again retrieves the subscriber data file after the test data file is received.

Once the relevant subscriber data file is retrieved, the central controller 44 executes step 240. In step 240, the central controller 44 generates a new level data file for the field tests database 52 based on the measurement information in the test data file. The central controller 44 stores the network location in field 162, the test measurement values and the pass/fail results in field 170, the technician ID in field 168, and the date and time in field 164 in the new level data file 160. The central controller 44 further stores the level data type in the field 166. The central controller 44 also stores any text notation in the text notation field 172.

Thereafter, or concurrently, in step 245, the central controller 44 determines whether the pass/fail results indicate that sufficient tests have been passed. If sufficient tests have been passed, then the work order may be closed out. Thus, if the answer in step 245 is in the affirmative, then in step 250, the central controller 44 changes the status information in the status field 114 of the subscriber data file 100 to indicate that the work order has been closed. If not, however, then in step 255 the central controller 44 ends the process but does change the status information of the status field to indicate closure of the work order.

Thus, the work order is not closed out if inadequate pass/fail results are received. To this end, the central controller 44 may either leave the status information unchanged, or change it to an indicator representative of the fact that the work order has been attempted unsuccessfully. If the work order as been attempted unsuccessfully, the CATV service provider may elect to reassign the work order to a higher level or specialized technician.

In an alternative embodiment, if insufficient pass/fail results are received, then the central controller 44 may close out the work order in step 255 and open another by storing a new work order number in the field 118 of the subscriber data file 100 and setting the status field 114 to indicate that the new work order is open.

In any event, the above first exemplary operation illustrates how the present invention provides enhanced convenience to technicians that must perform work assignments at subscriber locations having various service levels and overall channel plans. The enhanced convenience would presumably result in increased productivity. In addition, the automated closeout procedure described above improves the CATV service providers' ability to track service quality, system-wide performance, and productivity of the technicians.

Figure 9A:
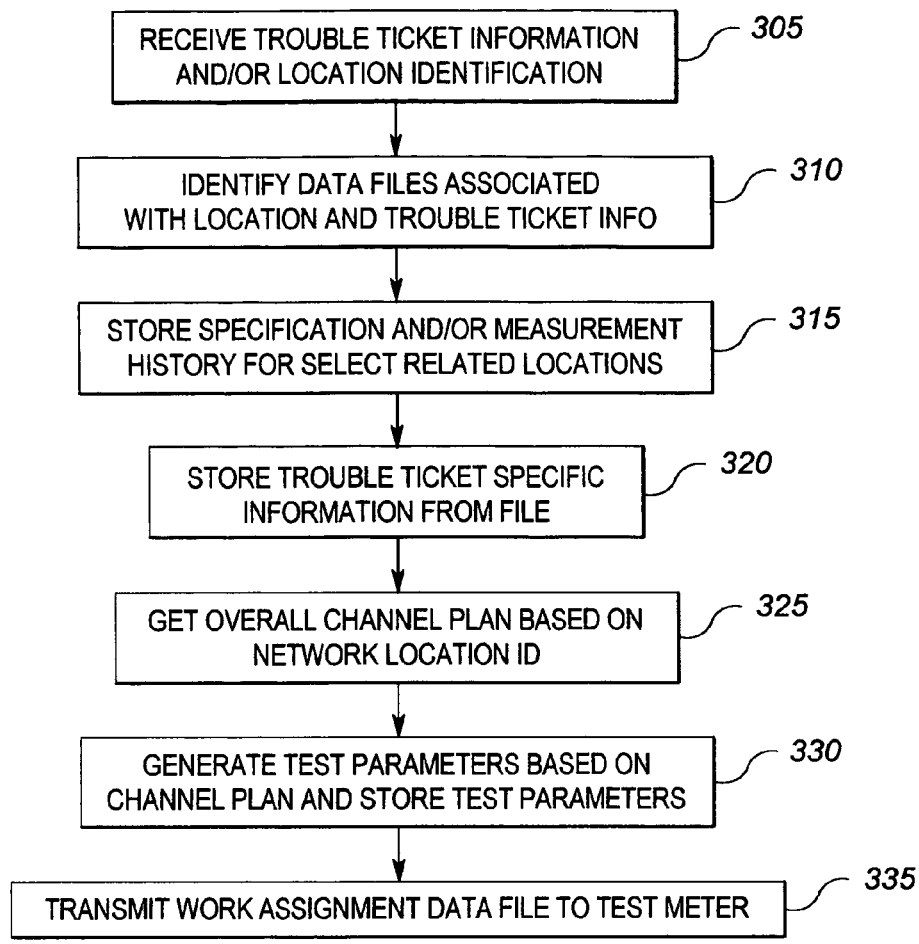
FIGS. 9a and 9b show flow diagrams of the operation of the central controller of the test system of FIG. 2 in accordance with a second exemplary work assignment operation.
Figure 9B:
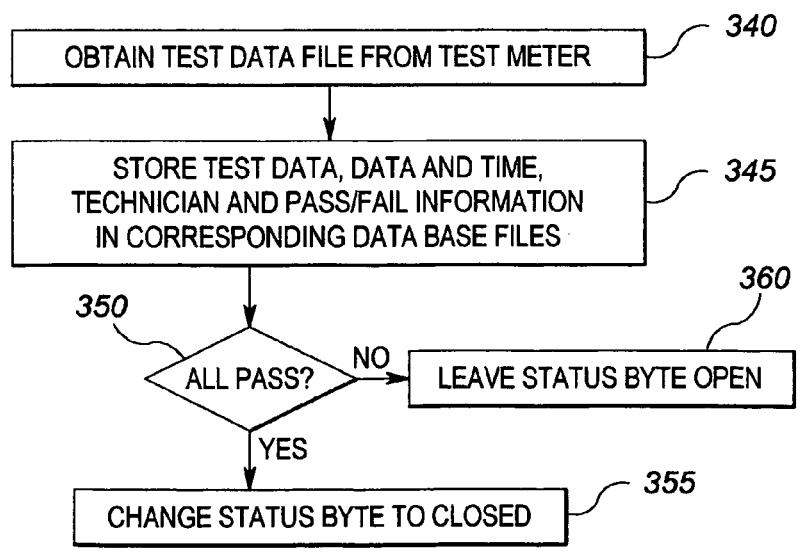
Figure 10:
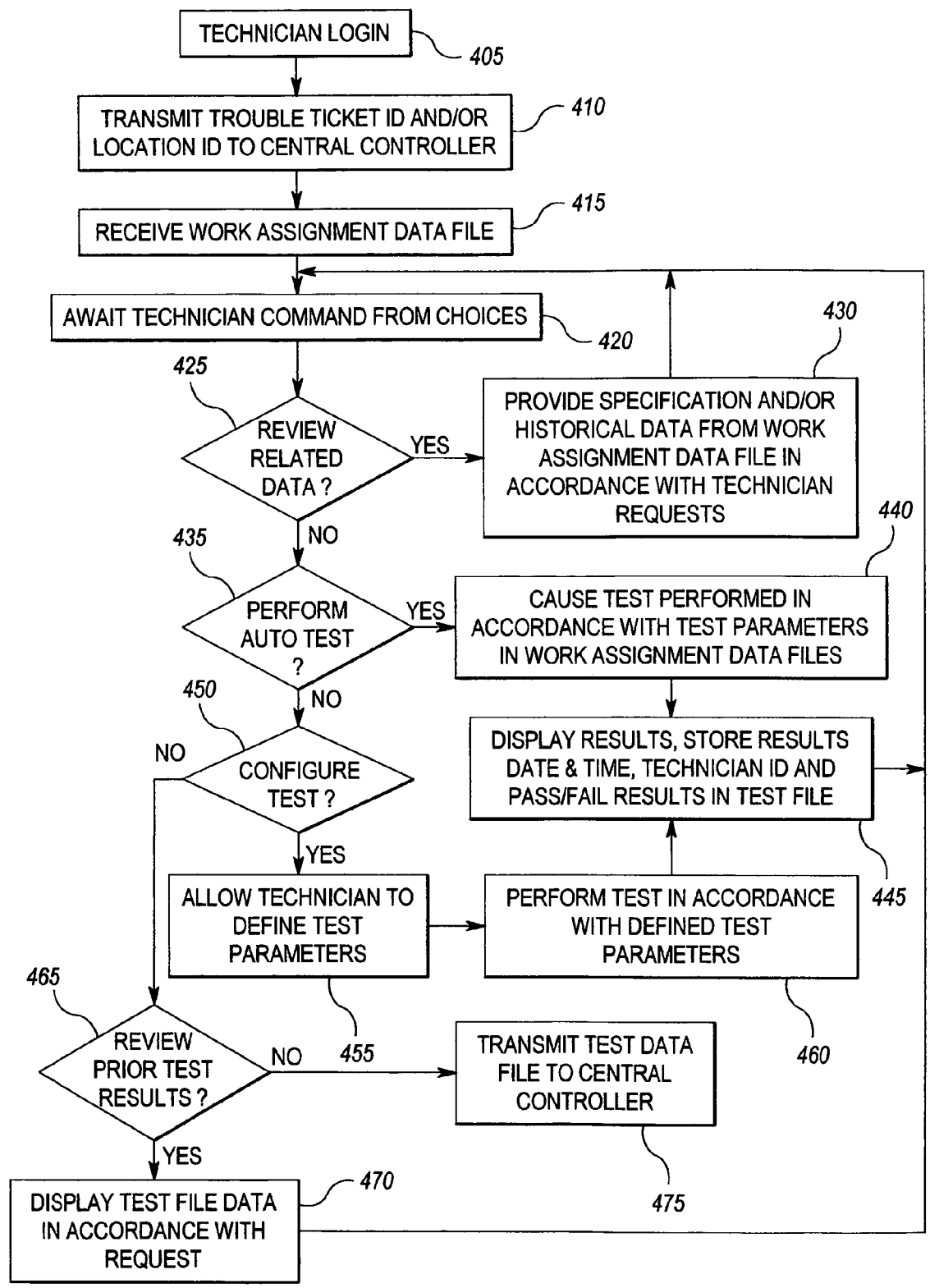
FIG. 10 shows a flow diagram of the operations of the test device of the test system of FIG. 2 in accordance with the second exemplary work assignment operation.

A second exemplary operation of the system of FIGS. 1 and 2 is provided through the description of the operations of the central controller 44 and the test meter controller 34 in the flow diagrams of FIGS. 9a, 9b and 10. FIGS. 9a and 9b show the operations of the central controller 44 while FIG. 10 shows the operation of the test meter controller 34. The second exemplary operation involves a work assignment that is associated with a trouble ticket, and may not relate to a known network location. As discussed above, a trouble ticket file 140 (See FIG. 6) may be generated when a number of complaints are registered in a particular area of the network. A trouble ticket file 140 may also be generated when automated monitoring equipment encounters repeated or severe alarm conditions in a particular area of the network.

The responsibility for working on trouble tickets may be assigned to technicians in a variety of ways. Trouble tickets may be communicated by a central office to technicians on the road via radio or cellular telephone. Alternatively, trouble tickets may be assigned on a daily or weekly basis through staff meetings, electronic mail or messaging communicated to the meter 30, or other means. Regardless of the method of communicating the assignment of trouble tickets, the operations with respect to a particular trouble ticket is discussed herebelow.

Referring to FIG. 9, the central controller 44 in step 305 first receives information identifying a trouble ticket number and location information from the test meter 30. The location information may take many forms, including network location ID information, street address information, or GPS location information. It is noted that the trouble ticket information may be derived from other information, such as a technician ID.

The trouble ticket number and the location information may be received at the same time, or alternatively, in multiple communications. For example, the central controller 44 may first receive a trouble ticket number from the test meter 30, and then retrieve the trouble ticket data file 140 and send the problem text information from field 144 to the test meter 30. The technician may then use the received problem text information to identify a network location at which to perform measurements. Once the technician arrives at the network location, the technician, via the test meter 30, transmits the location information to the central controller 44. In any event, whether concurrently or in multiple communications, the central controller 44 receives information identifying both the trouble ticket number and the network location.

After step 305, the central controller 44 proceeds to step 310. In step 310, the central controller 44 associates the received information to at least one, and preferably all, of the level data files 160 from the field test database 52 that correspond to the network location. The central controller also identifies the corresponding location data file 120 from the strand map database 50. Once the relevant level data files 160 and the appropriate location data file 120 are identified, the central controller 44 executes step 315.

In step 315, the central controller 44 begins to generate a work assignment data file by obtaining reference measurement data from one or more of the identified level data files 160. The reference measurement data may include specification measurement data and/or historical measurement data. The central controller 44 stores the obtained data, or a select portion thereof, in the work assignment data file. The central controller 44 also preferably obtains the upstream and downstream entity ID information from the fields 126 and 128 of the location data file 120 and stores the information in the work assignment data file.

Thereafter, in step 320, the central controller 44 obtains the text information from the fields 144 and 148 of the trouble ticket data file 140 that corresponds to the received trouble ticket number. The central controller 44 stores such text information in the work assignment data file.

In step 325, the central controller 44 also obtains the overall channel plan that corresponds to the network location ID. As discussed above in connection with step 215, the central controller 44 should have ready access to information that correlates network locations to overall channel plans. The overall channel plan includes the identity of all available channels in the portion of the network that includes the network location in question.

Thereafter, in step 330, the central controller 44 generates a set of test parameters based on the overall channel plan. In particular, the test parameters include a channel plan, which may suitably be the overall channel plan, test type information, and pass/fail parameters. The generation of such test parameters is discussed in further detail above in connection with step 215 of FIG. 7a. The generated test parameters are then stored in the work assignment data file.

In addition to the test parameters described in step 215 of FIG. 7a, however, the central controller 44 may further store test meter configuration information in the work assignment data file. In particular, the test meter 30 may require different configuration settings, such as compensation or attenuation levels, for different entities on the CATV network. For example, a subscriber drop line 21 (see FIG. 1) may require different attenuation characteristics than a street tap 20. Accordingly, the central controller 44 may generate the test meter configuration information based at least in part on the entity type from the entity type field 124 of the location data file 120. Alternatively, the controller 36 of the test meter 30 may determine the appropriate settings if the entity type is included in the work assignment data file.

In any event, once the test parameters are generated, then the central controller 44 proceeds to step 335. In step 335, the central controller 44 transmits the work assignment data file to the test meter 30.

As a result of the above functions, a remote meter can obtain significant amounts of data relating to a particular work assignment that is not necessarily associated with a particular subscriber. Such data can assist the technician in diagnosing and isolating problems on the CATV network. FIG. 9b shows the operations of the central controller 44 performed in connection with performing closeout operations in a work assignment of the form discussed in FIG. 9a.

Such operations are triggered by the receipt of reporting data from the test meter 30. For purposes of clarity, the operations of the test meter 30 are discussed prior to discussing the operations of FIG. 9*b*.

FIG. 10 shows the operations of the test meter controller 36 that correspond to the operations of the central controller 44 in FIG. 9*a*, discussed above. In step 405, the controller 36 receives the technician ID information. Thereafter, in step 410, the controller 36 transmits the trouble ticket number and the location information to the central controller 44. As discussed above in connection with step 305, the trouble ticket number and location information may be transmitted to the central controller 44 contemporaneously, or at different times. The technician that is using the test meter 30 may need to obtain the trouble ticket data in order to determine the appropriate network location to test. However, in other cases, the technician may already know the appropriate network location associated with the trouble ticket number and thus transmit both items of information at the same time.

It is noted that if the technician must determine the network location from the trouble ticket problem text information, then the technician may be required to travel to the determined network location in order to perform the work assignment tasks. To this end, the technician may cause the controller 36 to obtain access to the internetwork via the world wide web to obtain maps, travel directions, traffic reports, and even weather information that may assist the technician in traveling to the the determined network location.

In any event, once the trouble ticket ID and the location information is transmitted to the central controller 44 in step 410, the controller 36 proceeds to step 415. In step 415, the controller 36 awaits the reception of the work assignment data file from the central controller 44. A description of the preferred set of contents of the work assignment data file is discussed above in connection with FIG. 9*a*. Once step 415 is completed, the controller 36 proceeds to step 420.

In step 420, the controller 36 awaits a command from the technician received via the user interface 56. To this end, the controller 36 provides the technician with several choices. These choices include "review related data", "perform auto-test", "configure test", or "review test results". When the controller 36 receives the input, it executes the appropriate action. The execution of the requested action is represented in the flow diagram of FIG. 10 as a series of conditional statements, but may be carried out in software in a plurality of techniques well known in the art.

In step 425, the controller determines whether the command input is "review related data". If so, then the controller 36 proceeds to step 430. If not, however, the controller 36 continues on to step 435.

In step 430, the controller 36 obtains the specification data and/or historical measurement data from the work assignment data file and provides the data to the user interface 56. In particular, the controller 36 may provide the technician with the ability, via the user interface 56, to specify which portions of data to review. The controller 36 then provides the requested data for communication to the technician via the user interface 56. The technician may also, via the user interface 56, review the upstream and downstream entity information from the work assignment data file, and even request that the controller 36 obtain reference level information for one or more upstream or downstream entities from the central controller 44.

After completion of step 430, the controller 36 returns to step 420 to await the next command from the technician.

In step 435, the controller determines whether the command input is "perform auto-test". If so, then the controller 36 proceeds to step 440. If not, however, the controller 36 continues on to step 450.

In step 440, the controller 36 causes a test to be performed by the measurement circuit 38 in accordance with the test parameters received in the work assignment data file. The operations of step 440 are substantially identical to those discussed above in connection with steps 270 through 280 of FIG. 8. After the test is completed in step 440, the controller 36 executes step 445. In step 445, the controller 36 displays the results, and furthermore stores the measurement values, the pass/fail results (if any), the technician ID, and the date and time in a results data file. Upon completion of step 445, the controller 36 returns to step 420 to await the next command from the technician.

In step 450, the controller determines whether the command input is "configure test". If so, then the controller 36 proceeds to step 455. If not, however, the controller 36 continues on to step 465.

In step 455, the controller 36 obtains test parameters from the technician via the user input. The ability to allow the technician to define a custom test allows the technician to design a test based on the technician's analysis of the historical data and specification data from the relevant location data file 120, as well as the technician's analysis of the problem text (as well as any action text describing prior attempts to resolve the trouble ticket) from the relevant trouble ticket data file 140. For example, if the problem text from field 144 of the trouble ticket data file 140 describes complaints regarding a particular frequency, then the technician may configure a test for that frequency and a few adjacent frequencies. Similarly, if prior measurements for the affected nodes show relatively high leakage energy at that frequency, then the technician may configure a test for leakage instead of, or in addition to, SNR or absolute level measurement. Thus, the technician is given both information and the tools to perform specified tests.

Once the test parameters have been obtained in step 455, the controller 36 proceeds to step 460. In step 460, the controller 36 causes a test to be performed in accordance with the defined parameters. After step 455, the controller 36 proceeds to step 445 and proceeds as described above. Namely, the measurement results and other data is stored in the results data file and then the controller 36 returns to step 420.

In step 465, the controller determines whether the command input is "review prior results". If so, then the controller 36 proceeds to step 470. If not, however, the controller 36 continues on to step 475. In step 470, the controller 36 allows the technician to display prior test results from the results data file. Thereafter, the controller returns to step 420.

If the controller 36 reaches step 475, it means that the technician has made a selection to close out the session. In other words, the technician does not desire to perform any more tests or view any more data in connection with the trouble ticket. Accordingly, in step 475, the controller 36 transmits the results data file to the central controller 44. At some point prior to the transmission of the results data file, the trouble ticket number and network location ID are stored in the results data file to allow the central controller to sort the data appropriately. In addition, the technician should preferably be given the opportunity to record text notes that are incorporated into the results data file.

Referring now to FIG. 9*b*, the central controller 44 begins the closeout process by first obtaining the results data file from the meter controller 36 in step 340. The controller 44 thereafter, in step 345, generates a new level data file 160 and associates the new level data file 160 with the network location ID that is stored in the results data file. The controller 44 further obtains the appropriate trouble ticket data file 140. The controller 44 then stores in the appropriate fields of the new level data file 160 the measurement data, the pass/fail data, the technician ID, time and date, and any text notations from the results data file. The controller 44 further stores the technician ID, the time and date, the network location ID and the text notations from the results data file into the action field 148 of the trouble ticket data file 140.

Thereafter, or concurrently, in step 350, the central controller 44 determines whether the pass/fail results indicate that sufficient tests have been passed. If so, then in step 355, the central controller 44 changes the status information in the status field 146 of the trouble ticket data file 140 to indicate that the trouble ticket has been closed. If not, however, then in step 360 the central controller 44 ends the process but does change the status information of the status field to indicate closure of the trouble ticket. Thus, the trouble ticket is not closed out unless sufficient pass/fail results are received. To this end, the central controller 44 may either leave the status information unchanged, or change it to an indicator representative of the fact that the trouble ticket has been attempted unsuccessfully.

The above second exemplary operation thus provides enhanced convenience to technicians that must perform work assignments at locations that may not be subscriber locations, and thus may not rely on subscriber data base information for useful test and historical data. The enhanced convenience should result in increased productivity. In addition, as with the operations of FIGS. 7b and 8, the automated closeout procedures described above improves the CATV service providers' ability to track service quality, system-wide performance, and productivity of the technicians.

It will be appreciated that the above described embodiments are merely exemplary, and that those of ordinary skill in the art may readily devise their implementations that incorporate the principles of the present invention and fall within the spirit and scope thereof.

We claim:

1. A method of performing work on a communication system in accordance with a work assignment, comprising:
   a) identifying at least one data file associated with the work assignment, the data file including subscription information and network location information, the subscription information further including channel configuration information;
   b) preparing at least a first set of test parameters for performing a network test, the first set of parameters based on, at least in part, the subscription information, the channel configuration information, and the network location information;
   c) communicating the test parameters to a test device; and
   d) employing the test device to perform a first test using the first set of test parameters.

2. The method of claim 1, wherein the subscription information includes information identifying one or more optional program services in a television broadcast system.

3. The method of claim 1, wherein step b) further comprises preparing the first set of test parameters such that the first set of test parameters include information identifying one or more channel frequencies to be tested that were identified by the channel configuration information.

4. The method of claim 3, wherein step b) further comprises preparing the first set of test parameters such that the first set of test parameters include at least one pass/fail parameter associated with at least one of the channel frequencies to be tested that were identified by the channel configuration information.

5. The method of claim 1, wherein step b) further comprises preparing the first set of test parameters such that the first set of test parameters include at least one pass/fail parameter.

6. The method of claim 3, wherein step b) further comprises preparing the information identifying the number of channel frequencies to be tested based on the network location information.

7. The method of claim 3, wherein step b) further comprises preparing the first set of test parameters such that the first set of test parameters include at least one test type parameter associated with the channel of frequencies to be tested that were identified by the channel configuration information.

8. The method of claim 7 wherein the at least one test type parameter includes an analog channel test type.

9. The method of claim 7 wherein the at least one test type parameter includes a digital channel test type.

10. The method of claim 1, wherein step c) further comprises communicating the first set of test parameters using a cable modem or a wireless communication medium.

11. The method of claim 1, further comprising: communicating information corresponding to the at least one data file to a central office with the test device from a location remote from the central office; wherein steps a), b) and c) are conducted at the central office, and step d) is conducted at the remote location.

12. The method of claim 1, wherein step c) further comprises communicating the first set of test parameters using the wireless communication medium and an internetwork.

13. A central control system for use in a testing system that employs one or more remote test units, the central control system comprising:
   a central controller operable to identify at least one data file associated with the work assignment, the data file including subscription information having channel configuration information, and network location information, the central controller further operable to prepare at least a first set of test parameters for performing a network test, the first set of parameters based on, at least in part, the subscription information, the channel configuration information, and the network location information, and
   a communication circuit operable to communicate the first set of test parameters to a remote test device.

14. The central control system of claim 13 further comprising a subscriber data base, and wherein the central controller is further operable to identify the data file within the subscriber data base.

15. The central control system of claim 13, wherein the subscription information includes information identifying one or more optional program services in a television broadcast system.

16. The central control system of claim 13, wherein the central controller is further operable to prepare the first set of test parameters such that the first set of test parameters include information identifying one or more channel frequencies to be tested that were identified by the channel configuration information.

17. The central control system of claim 16, wherein the central controller is further operable to prepare the first set of test parameters such that the first set of test parameters include at least one pass/fail parameter associated with at least one of the channel frequencies to be tested that were identified by the channel configuration information.

18. The central control system of claim 16, wherein the central controller is further operable to prepare the information identifying the number of channel frequencies to be tested based on the network location information.

19. The central control system of claim 16, wherein the central controller is further operable to prepare the first set of test parameters such that the first set of test parameters include at least one test type parameter associated with the number of channel of frequencies to be tested that were identified by the channel configuration information.

20. A test meter for use in testing a communication system, the test meter comprising:
- a) a communication circuit operable to communicate with a central control system;
- b) a measurement circuit operable to obtain measurements from the communication system;
- c) a controller operably coupled to the communication circuit, the controller operable to
  - communicate intonation corresponding to at least one data file to the central control system via the communication circuit, the data file including network address information and subscription information that includes channel configuration information;
  - receive a first set of test parameters from the head end controller, the first set of test parameters based on the network address information and subscription information that includes channel configuration information; and
  - cause the measurement device to perform a first test based on the first set of test parameters.

21. The test meter of claim 20 wherein the controller is further operable to communicate information corresponding to a data file as a work assignment that is associated with the data file.

22. The test meter of claim 20 wherein the controller is further operable to communicate information corresponding to a data file as a location identifier.

23. The test meter of claim 22, further comprising a GPS receiver operable coupled to the controller, and wherein the controller is further operable to generate the location identifier based on information obtained through the GPS receiver.

24. The test meter of claim 22, further comprising a user interface, and wherein the controller is further operable to generate the location identifier based on information received from a user via the user interface.

25. The test meter of claim 20, wherein the controller is further operable to receive the first set of test parameters from the head end controller, the first set of test parameter including information identifying one or more channel frequencies to be tested that were identified by the channel configuration information.

26. The test meter of claim 25, wherein the controller is further operable to receive the first set of test parameters from the head end controller, the first set of test parameter including intonation identifying at least one test type corresponding to the one or more channel frequencies to be tested that were identified by the channel configuration information.

27. The test meter of claim 20, wherein the communication circuit comprises a cable modem.

28. The test meter of claim 20, wherein the communication circuit is operable to communicate with the head end controller using, at least in part, an internetwork.

29. The test meter of claim 20, wherein the communication circuit includes a wireless communication device.

* * * * *

UNITED STATES PATENT AND TRADEMARK OFFICE
CERTIFICATE OF CORRECTION

PATENT NO. : 7,111,318 B2  Page 1 of 1
APPLICATION NO. : 09/872030
DATED : September 19, 2006
INVENTOR(S) : Vitale et al.

It is certified that error appears in the above-identified patent and that said Letters Patent is hereby corrected as shown below:

Col. 25, line 22, "communicate intonation" should read -- communicate information --

Col. 26, line 24, "including intonation" should read -- including information --

Signed and Sealed this

Fifteenth Day of May, 2007

JON W. DUDAS
*Director of the United States Patent and Trademark Office*